United States Patent [19]
Haug

[11] 4,284,752
[45] Aug. 18, 1981

[54] PROCESS FOR PRODUCING CROSSLINKED UNSATURATED POLYMERS BY REACTION OF β-AMINOCROTONIC ACID ESTERS, NITRILES OR AMIDES WITH POLYISOCYANATES

[75] Inventor: Theobald Haug, Frenkendorf, Switzerland

[73] Assignee: Ciba-Geigy Corporation, Ardsley, N.Y.

[21] Appl. No.: 147,991

[22] Filed: May 8, 1980

[30] Foreign Application Priority Data

May 8, 1979 [CH] Switzerland ..................... 4309/79

[51] Int. Cl.³ ............................................. C08G 18/00
[52] U.S. Cl. ..................................................... 528/68
[58] Field of Search ........................................... 528/68

[56] References Cited

U.S. PATENT DOCUMENTS 3,845,014  10/1974  Frank et al. ............................ 528/68
4,089,845  5/1978   Haug et al. ............................ 526/262

FOREIGN PATENT DOCUMENTS 2633294  1/1978  Fed. Rep. of Germany.

Primary Examiner—Maurice J. Welsh
Attorney, Agent, or Firm—Harry Falber

[57] ABSTRACT

Novel, crosslinked, unsaturated polymers which have properties better than those of known crosslinked, unsaturated polymers are produced by reaction of β-aminocrotonic acid esters, nitriles or amides with polyisocyanates, at temperatures for example of between 50° and 180° C.

15 Claims, No Drawings

PROCESS FOR PRODUCING CROSSLINKED UNSATURATED POLYMERS BY REACTION OF β-AMINOCROTONIC ACID ESTERS, NITRILES OR AMIDES WITH POLYISOCYANATES

Crosslinked unsaturated block polyamides are described in the German Offenlegungsschrift (published specification) No. 2,633,294. Materials produced therefrom have, compared with those produced from corresponding uncrosslinked polymers, an improved dimensional stability and greater resistance to solvents.

These block polyamides are produced by crosslinking of polymers with enamine structures in the polymer chain by means of polyisocyanates, as are obtained by polycondensation of bis-acetoacetamides with dihydrazide compounds. The unsaturated polymers used as starting substances have molecular weights of between 5,000 and 40,000. They are therefore highly viscous substances, of which the processing and mixing with reactants thus creates difficulties. The reaction with the polyisocyanates is hence carried out either in a kneader or in solution.

According to the disclosures in German Offenlegungsschrift No. 2,633,294, the production of shaped articles using casting processes is not possible.

It is notable with regard to this known process that the reaction is performed principally with less than the equivalent amount of polyisocyanates. An increasing of the amount of polyisocyanate, a measure frequently applied in conventional polyurethane techniques for the purpose of obtaining an improvement in the technical properties of the final products, is in this case obviously not successful.

The object of the present invention is to provide a process for producing crosslinked unsaturated polymers, in which process the crosslinking is likewise effected by way of polyisocyanates but wherein processing is carried out under more favourable rheological conditions, so that also the casting process can be employed without difficulties. Furthermore, it is to be possible, by application of an excess of polyisocyanates, to achieve also a modification, particularly an improvement, of the properties of the polymers. The object of the invention includes therefore also the obtainment of novel crosslinked, unsaturated polymers which have properties better than those of the block polyamides according to German Offenlegungsschrift No. 2,633,294.

The present invention relates to a process for producing crosslinked unsaturated polymers, which process comprises reacting monomeric or oligomeric β-aminocrotonic acid esters or β-aminocrotonic acid nitriles or β-aminocrotonic acid amides with polyisocyanates, the composition of the reaction mixture being such that to one molecular group of the formula

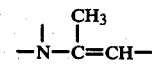

of the respective β-aminocrotonic acid derivative there is at least one isocyanate group, preferably 1 to 2 isocyanate groups. The reaction can be performed at temperature of above 20° C., preferably between 50° and 180° C.

β-Aminocrotonic acid esters preferably used are those of the formulae I to III:

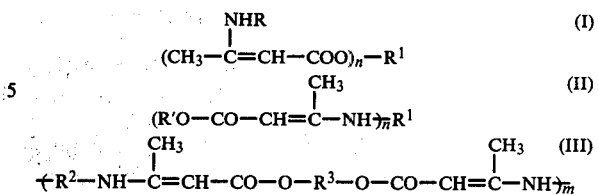

wherein R is a hydrogen atom or a saturated or unsaturated, straight-chain, branched-chain or cyclic hydrocarbon radical having up to 9 C atoms, R' is a saturated or unsaturated, straight-chain, branched-chain or cyclic hydrocarbon radical having up to 9 C atoms, n is one of the numbers 2, 3 or 4, and m is a number from 4 to 15, $R^1$ is an n-valent, and $R^2$ and $R^3$ are each a bivalent, straight-chain, branched-chain or cyclic hydrocarbon radical optionally containing ether bridges and having up to 20 C atoms, or a bivalent heterocyclic ring containing N, O or S atoms, whereby $R^2$ and $R^3$ are identical or different.

R can be $C_1$–$C_9$-alkyl, for example methyl, isopropyl, n-butyl, 2-ethylhexyl or n-nonyl, or $C_2$–$C_9$-alkenyl, for example vinyl, allyl, methallyl or 1-nonenyl; as a cyclic hydrocarbon radical, R is for example phenyl.

R is preferably hydrogen or $C_1$–$C_4$-alkyl, particularly preferably hydrogen.

As a bivalent radical, $R^1$ can be for example $C_2$–$C_{20}$-alkylene, such as ethylene, n-butylene, n-hexylene, —CH₂CH₂—O—CH₂CH₂—, ─(CH₂CH₂—O)₂CH₂CH₂—, or a cyclic hydrocarbon radical, for example 1,4-cyclohexylene, 1,4-phenylene, p-xylylene, or the group

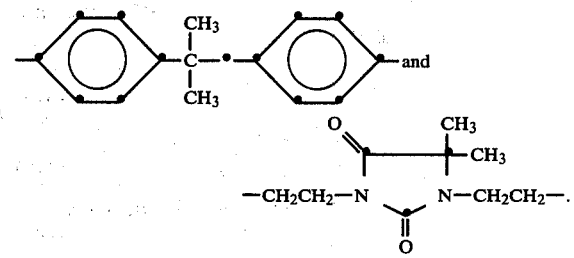

As a trivalent radical, $R^1$ can be for example the group:

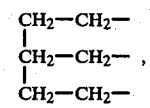

and as a tetravalent radical, it can be for example:

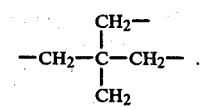

$R^1$ is preferably a bivalent aliphatic radical optionally containing ether bridges, particularly n-butylene or ─(CH₂CH₂—O)₂CH₂CH₂—.

$R^1$ can be $C_1$–$C_9$-alkyl, for example methyl, isopropyl, n-butyl, 2-ethylhexyl or n-nonyl, or $C_2$–$C_9$-alkenyl, for example vinyl, allyl, methallyl or 1-nonenyl; as a cyclic hydrocarbon radical, R' is for example phenyl. Preferably, R' is C$_1$–C$_4$-alkyl or C$_2$–C$_4$-alkenyl, particularly preferably it is methyl or allyl.

β-Aminocrotonic acid esters of the formula I or II are particularly preferably used, especially those in which in each case n is the number 2 and R$^1$ is a bivalent straight-chain aliphatic radical optionally containing ether bridges, especially n-butylene or —(CH$_2$C-H$_2$—O—)$_2$CH$_2$CH$_2$—.

R$^2$ can be C$_2$–C$_{20}$-alkylene, for example ethylene, n-hexylene or 2,4,4-trimethylhexamethylene; as a cyclic hydrocarbon, R$^2$ can be for example o-, m- or p-phenylene, p-xylylene or the group

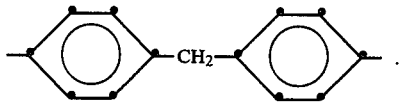.

R$^2$ is preferably C$_2$–C$_9$-alkylene, especially 2,4,4-trimethylhexamethylene.

R$^3$ can be C$_2$–C$_{20}$-alkylene which can optionally be interrupted by ether bridges, for example ethylene, n-hexylene or the group —CH$_2$CH$_2$—O—CH$_2$CH$_2$—; as a cyclic hydrocarbon radical, R$^3$ can be for example 1,4-cyclohexylene or the group

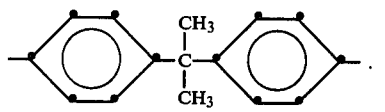.

Preferably, R$_2$ is C$_2$–C$_9$-alkylene, especially n-butylene.

β-Aminocrotonic acid nitriles preferably used are those of the formulae IV to VI

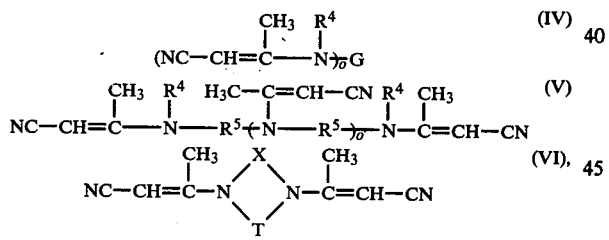

wherein R$^4$ is a hydrogen atom, alkyl having 1 to 6 C atoms, cycloalkyl having 5 to 6 C atoms or aryl having 6 to 10 C atoms, o' is one of the numbers 1, 2 or 3, o is either the number 2 or 3, G is an o-valent organic radical having 2 to 30 C atoms, and R$^5$ is an aromatic or aliphatic radical having up to 30 C atoms, and X and T are such organic radicals which form with the two N atoms a 5- or 6-membered heterocyclic ring.

As C$_1$–C$_6$-alkyl, R$^4$ can be for example methyl, ethyl, isopropyl, n-butyl or n-hexyl.

As cycloalkyl, R$^4$ can be for example cyclopentyl or cyclohexyl.

As aryl, R$^4$ can be for example phenyl.

R$^4$ is preferably hydrogen.

G can be a bivalent radical which is for example an aliphatic radical which is optionally interrupted with O or S bridges, which is unsubstituted or substituted by C$_1$–C$_4$-alkoxy, and which can be branched-chain or straight-chain. G can also be 5-8-cycloalkylene or

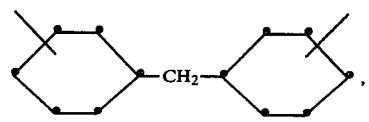

particularly 1,4-cyclohexylene, in which the rings are unsubstituted or substituted by C$_1$–C$_4$-alkyl. As an aromatic radical, G can be C$_6$–C$_{10}$-arylene, such as 1,3- or 1,4-phenylene or 1,5-naphthylene, or a bicyclic radical of the formula

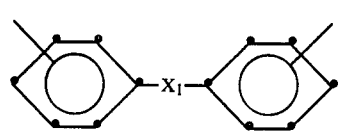 (A)

wherein X$_1$ is —O—, —CH$_2$—, —SO$_2$—,

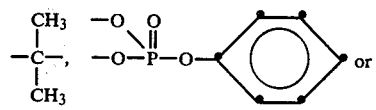 or

—COO-alkylene-(C$_2$–C$_6$)—OOC—, wherein the phenyl rings can be unsubstituted or each substituted by chlorine. G can also be an aromatic-aliphatic radical, such as m- or p-xylylene. G can also be a bivalent 5- or 6-membered N-heterocycle which can be benzocondensed and/or substituted on the N atom with C$_1$–C$_4$-alkyl or phenyl.

As a bivalent radical, G is preferably a C$_2$–C$_6$ aliphatic, aromatic or aromatic-aliphatic radical, especially n-hexylene or

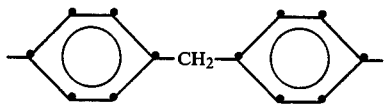.

G can be a trivalent radical, this being a C$_2$–C$_{30}$ aliphatic radical optionally interrupted by O bridges, a mono- or polyvalent aryl, such as benzenetriyl or naphthalenetriyl, or bicyclic aryl of the formula B

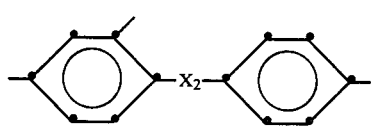 (B)

wherein X$_2$ is —O—, —CH$_2$—, —SO$_2$—, $\overset{O}{\underset{}{\|}}$—,
  C

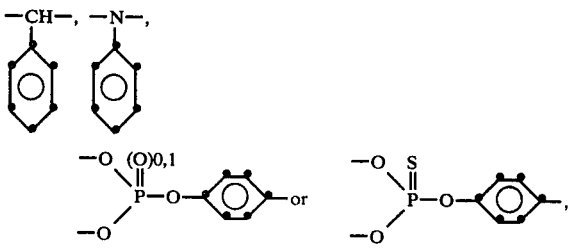

the phenyl rings being unsubstituted or each substituted by a $C_1$–$C_4$-alkyl group, or G can be a 5- or 6-membered N-heterocycle.

As a trivalent radical, G is preferably an aromatic radical, in particular a monocyclic radical.

As a $C_2$–$C_{30}$ aliphatic radical, $R^5$ can be for example ethylene, n-propylene or n-butylene. $C_2$–$C_6$-alkylene is preferred.

As an aromatic radical, $R^5$ can be for example p-phenylene.

X and T can form with the two N atoms for example a piperazine, hexahydropyrimidine or imidazolidine ring. Piperazine is preferred.

Particularly preferably used are β-aminocrotonic acid nitriles of the formula IV in which in each case n is the number 2, and G is a bivalent aliphatic, aromatic or aromatic-aliphatic radical, particularly n-hexylene or

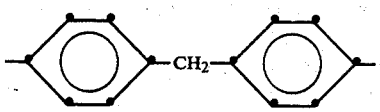

β-Aminocrotonic acid amides preferably used are those of the formulae VII to IX

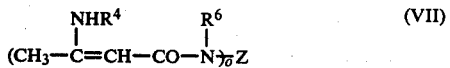

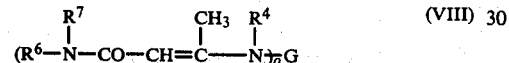

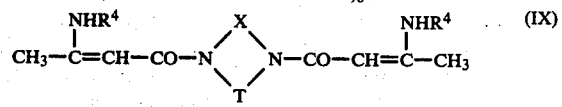

wherein $R^4$, $R^6$ and $R^7$ independently of one another are each a hydrogen atom, alkyl having 1 to 6 C atoms, cycloalkyl having 5 to 6 C atoms or aryl having 6 to 10 C atoms, o is either the number 2 or 3, and G and Z independently of one another are each an o-valent organic radical having 2 to 30 C atoms, and X and T are organic radicals which can form with the two N atoms a 5- or 6-membered heterocycle ring.

Examples of and preferences for the meaning of G, $R^4$, X and T have already been given for the formulae IV to VI. Z can have the same meaning as G. Preferably, Z is a bivalent $C_2$–$C_6$ aliphatic radical, especially n-hexylene.

$R^6$ and $R^7$ can have the same meaning as $R^4$. $R^4$ and $R^6$ are preferably hydrogen. $R^7$ is preferably $C_1$–$C_4$-alkyl.

Particularly preferably used are β-aminocrotonic acid amides of the formula VII in which in each case $R^4$ is a hydrogen atom, o is the number 2, and Z is a bivalent aliphatic radical, particularly n-hexylene, as well as mixtures thereof with a β-aminocrotonic acid ester of the formula I wherein n is the number 2, and $R^1$ is n-butylene.

Polyisocyanates are to be understood according to the invention as being organic isocyanates having 2 or more isocyanate groups per molecule. Virtually all isocyanates customarily used today in the polyurethane industry are applicable according to the invention. They are thus aliphatic and aromatic isocyanates, for example $C_4$–$C_9$-alkylenediisocyanates, such as tetra- and hexamethylenediisocyanate, isomeric mixtures of 2,2,4- and 2,4,4-trimethylhexamethylenediisocyanate, trimerised hexamethylenediisocyanate, arylenediisocyanates, which are unsubstituted or can be substituted by $C_1$–$C_4$-alkyl, such as m- and p-phenylenediisocyanate, naphthylenediisocyanates, diphenylmethane-4,4'-diisocyanate, toluylenediisocyanates, such as 2,4- and 2,6-toluylenediisocyanate and mixtures thereof, di- and triisopropylbenzenediisocyanates and triphenylmethanetriisocyanates, tri-(p-isocyanatophenyl)thiophosphate, tri-(p-isocyanatophenyl)-phosphate, aralkyldiisocyanates, such as 1-(isocyanatophenyl)-ethylisocyanate or m- and p-xylylenediisocyanate, and also polyisocyanates of the above listed types which are substituted by various groups, for example by $C_1$–$C_4$-alkoxy, phenoxy (where the phenyl can be substituted by $C_1$–$C_4$-alkyl), $NO_2$ or Cl, also polyphenylpolymethylenepolyisocyanate, which is obtained by aniline-formaldehyde condensation and subsequent reaction with phosgene, in addition the reaction products of the above-mentioned isocyanates with an amount less than the equivalent amount of polyhydroxyl compounds, such as trimethylolpropane, hexanetriol, glycerol and butanediol, or also of water. There can also be mentioned here the polyisocyanates for example masked by phenols or by bisulfite, as well as polymerised isocyanates with an isocyanurate ring structure. Those preferred are aliphatic polyisocyanates, particularly the isomeric mixture of 2,2,4- and 2,4,4-trimethylhexamethylenediisocyanate, trimerised hexamethylenediisocyanate or diphenylmethane-4,4'-diisocyanate, or the mixture of the two last-mentioned diisocyanates.

The β-aminocrotonic acid esters of the formulae I to III belong to a known class of compounds, and they can be produced by the processes described in "Liebigs Annalen," Volume 213, p. 171, or in "Berichten der Deutschen Chemischen Gesellschaft," Volume 20, p. 247 (1887). The respective β-ketocarboxylic acid esters are accordingly reacted with ammonia or monoamines for producing the compounds of the formula I; with di-, tri- or tetramines for producing the compounds of the formula II; and with diamines for producing the compounds of the formula III. The β-aminocrotonic acid esters of the formulae I and II have moreover also been fully described in the U.S. Pat. No. 4,089,845.

The following may be mentioned as examples of compounds of the formula I: 1,2-ethylene glycol-bis-(β-aminocrotonic acid ester), 1,4-butylene glycol-bis-(β-aminocrotonic acid ester), 1,6-hexamethylene glycol-bis-(β-aminocrotonic acid ester), α,ω-diethylene glycol-bis-(β-aminocrotonic acid ester), α,ω-triethylene glycol-bis-(β-aminocrotonic acid ester), 1,4-cyclohexanediol-bis-(β-aminocrotonic acid ester), hydroquinone-bis-(β-aminocrotonic acid ester), 2,2-bis-(4-hydroxyphenyl)-propane-bis-β-aminocrotonic acid ester), α,α'-dihydroxy-p-xylylene-bis-(β-aminocrotonic acid ester), bis-(β-hydroxyethyl)-5,5-dimethylhydantoin-bis-(β-aminocrotonic acid ester, 1,2-ethylene glycol-bis-(β-methylaminocrotonic acid ester), 1,4-butylene glycol-bis-(β-butylaminocrotonic acid ester), 2,2-bis-(4-hydroxyphenyl)-propane-bis-(β-anilinocrotonic acid ester), trimethylolpropane-tris-(β-aminocrotonic acid ester) and pentaerythritol-tetra-(β-aminocrotonic acid ester).

Examples of compounds of the formula II which may be mentioned are: N,N'-ethylene-bis-(β-aminocrotonic acid methyl ester), N,N'-butylene-bis-(β-aminocrotonic acid ethyl ester), N,N'-(2,4,4-trimethyl)-hexamethylenebis-(β-aminocrotonic acid methyl ester), N,N'-p-phenylene-bis-(β-aminocrotonic acid methyl ester), N,N'-4,4'-diphenylenemethane-bis-(β-aminocrotonic acid methyl ester), N,N'-m-xylylene-bis-(β-aminocrotonic acid phenyl ester), N,N'-[bis-(β-aminocrotonic acid methyl ester]-1,3-di-(γ-aminopropyl)-5,5-dimethylhydantoin and N,N'-4,4'-dicyclohexylmethane-bis-(β-aminocrotonic acid ethyl ester).

The β-aminocrotonic acid esters of the formula III can be produced from bis-acetoacetic esters, for example 1,2-ethylene glycol-bis-(acetoacetic ester), 1,6-hexamethylene glycol-bis-(acetoacetic ester), α,ω-diethylene glycol-bis-(acetoacetic ester), 1,4-cyclohexanediol-bis-(acetoacetic ester), 2,2-bis-(4-hydroxyphenyl)-propane-bis-(acetoacetic ester) and diamines, for example ethylenediamine, hexamethylenediamine, 2,4,4-trimethylhexamethylenediamine, p-, m- or o-phenylenediamine, 4,4'-diaminodiphenylmethane and p-xylylenediamine. The substances of the formula III can be produced either from a bis-acetoacetic acid ester and a diamine, or from mixtures of such reactants.

The β-aminocrotonic acid nitriles of the formulae IV to VI are likewise known compounds, and can be produced, for example using the processes described in "Journal für praktische Chemie," Volume 78 (1908), p. 497, or in "Berichte der Deutschen Chemischen Gesellschaft," Vol. 60 (1927), p. 1826, by reacting the unsubstituted β-aminocrotonic acid nitrile with di- or polyamines of the formulae IVa to VIa

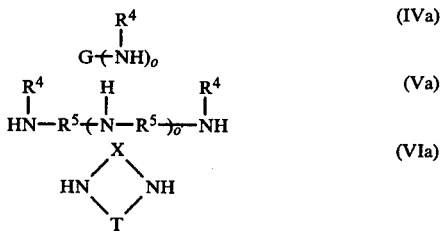

wherein G, $R^4$, $R^5$, o, o', X and T have the same meanings as in the formulae IV to VI, with the removal of ammonia.

The following may be mentioned as examples of diamines of the formula IVa: ethylenediamine, butylenediamine, hexamethylenediamine, 2,4,4-trimethylhexamethylenediamine, octamethylenediamine, decamethylenediamine, dodecamethylenediamine, 2,2-dimethyl-1,3-diaminopropane, 2,5-dimethyl-1,5-diaminoheptane, 2,5-dimethyl-1,6-diaminohexane, 2,5-dimethyl-1,7-diaminoheptane, 3,3,5-trimethyl-1,6-diaminohexane, 1,2-bis-(3-aminopropoxy)-ethane, 3-methoxy-1,6-diaminohexane, $N_2H(CH_2)_3O(CH_2)_3NH_2$, $H_2N—C_2H_4—S—C_2H_4—NH_2$, 4,4-diamino-dicyclohexylmethane, 1,4-diamino-cyclohexane, m-phenylenediamine, p-phenylenediamine, 1,4-diaminodiphenylmethane, 3,3'-dichloro-4,4'-diaminodiphenylmethane, bis-(4-aminophenyl)-2,2-propane, 4,4'-diaminodiphenyl ether, 4,4'-diaminodiphenylsulfone, 1,5-diaminonaphthalene, m-xylylenediamine, p-xylylenediamine, 1,3-bis-(γ-aminopropyl)-5,5-dimethylhydantoin, 4,4'-diaminotriphenyl phosphate, 3-aminomethyl-3,5,5-trimethylcyclohexylamine ("isophoronediamine"), 4,4'-methylene-bis-(2-methylcyclohexylamine), 4-amino-3-aminomethylpiperidine, 3-amino-4-aminomethylpyrrolidines substituted on the N atoms by $C_1$-$C_4$-alkyl, for example 1-methyl-3-amino-4-aminomethylpyrrolidine, phenylindolediamine, 2,5-di-(ω-aminoalkyl)-pyrazine having 1-4 C atoms in the alkyl group, bis-(p-aminobenzoic acid ester) or bis-(anthranilic acid ester) of $C_2$-$C_6$ aliphatic diols, as well as di-secondary diamines, such as N,N'-di-(cyclohexyl)-hexamethylenediamine or N,N'-di-(cyclopentyl)-hexamethylenediamine.

Examples of trivalent amines of the formula IVa which may be mentioned are: 1,2,4-triaminobenzene, 1,3,5-triaminobenzene, 2,4,6-triaminotoluene, 2,4,6-triamino-1,3,5-trimethylbenzene, 1,3,7-triaminonaphthalene, 2,4,4'-triaminodiphenyl, 3,4,6-triaminopyridine, 2,4,4'-triaminophenyl ether, 2,4,4'-triaminodiphenylmethane, 2,4,4'-triaminodiphenylsulfone, 2,4,4'-triaminobenzophenone, 2,4,4'-triamino-3-methyldiphenylmethane, N,N,N-tri-(4-aminophenyl)-amine, tri-(4-aminophenyl)-methane, tri-(4-aminiphenyl)-phosphate, tri-(4-aminophenyl)-phosphite, and tri-(4-aminophenyl)-thiophosphate, as well as

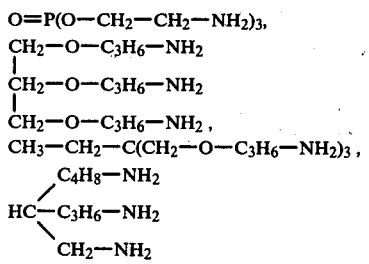

1,8-diamino-4-aminomethyl-octane.

Suitable aliphatic amines of the formula Va are for example dialkylenetriamines and trialkylenetetramines, preferably those having an alkylene group containing 2 to 6 C atoms, such as diethylenetriamine, triethylenetetramine, dipropylenetriamine, tripropylenetetramine or tributylenetetramine. A suitable aromatic amine is for example 4,4'-diaminodiphenylamine.

Amines of the formula VIa which may be mentioned are piperazine, hexahydropyrimidine and imidazolidine.

The β-aminocrotonic acid amides of the formulae VII to IX likewise belong to a known class of compounds, and can be produced according to the processes described in "Liebigs Annalen," Volume 213, p. 171, or in "Berichte der Deutschen Chemischen Gesellschaft," Volume 20, p. 274 (1887). The respective β-ketocarboxylic acid amides are accordingly reacted with ammonia or monoamines to produce the compounds of the formulae VII and IX, and with di-, tri- and tetramines for producing the compounds of the formula VIII.

The following may be mentioned as examples of compounds of the formula VII: N,N'-bis-(β-aminocrotonyl)-ethylenediamine, N,N'-bis-(β-aminocrotonyl)-hexamethylenediamine, N,N'-bis-(β-aminocrotonyl)-2,4,4-trimethylhexamethylenediamine, N,N'-bis-(β-aminocrotonyl)-dodecamethylenediamine, N,N'-bis-(β-aminocrotonyl)-m-phenylenediamine, N,N'-bis-(β-aminocrotonyl)-4,4'-diaminodiphenylmethane, N,N'-bis-(β-aminocrotonyl)-3,3'-dichloro-4,4'-diaminodiphenylmethane, N,N'-bis-(β-aminocrotonyl)-4,4'-diamino-3,3'-dimethyldicyclohexylmethane, N,N'-bis-(β-aminocrotonyl)-1,4-diaminocyclohexane, N,N'-bis-(β-aminocrotonyl)-p-xylylenediamine, N,N'-bis-(β-aminocrotonyl)-1,3-di-(γ-aminopropyl)-5,5-dimethylhydantoin, N,N'-bis-(β-methylaminocrotonyl)-ethylenediamine, N,N'-bis-(β-anilinocrotonyl)-hexamethylenediamine, N,N'-bis-(β-butylaminocrotonyl)-4,4'-diaminodiphenylmethane, N,N'-bis-(β-butylaminocrotonyl)-4,4'-diamino-dicyclohexylmethane, N,N'-bis-(β-cyclohexylaminocrotonyl)-1,4-diaminocyclohexane.

Examples of compounds of the formula VIII which may be mentioned are: N,N'-ethylene-bis-(β-aminocrotonic acid methylamide), N,N'-hexamethylene-bis-(β-aminocrotonic acid-n-butylamide), N,N'-(2,4,4-trimethyl)hexamethylene-bis-(β-aminocrotonic acid-n-butylamide, N,N'-butylene-bis-(β-aminocrotonic acid diethylamide), N,N'-p-phenylene-bis-(β-aminocrotonic acid anilide), N,N'-bis-(β-aminocrotonic acid methylanilide)-4,4'-diaminodiphenylmethane, N,N'-bis-(β-aminocrotonic acid cyclohexylamide)-3,3'-dimethyl-4,4'-diaminodicyclohexylmethane and N,N'-bis-(β-aminocrotonic acid amide)-1,3-di-γ-aminopropylene-5,5-dimethylhydantoin.

Compounds of the formula IX which may be mentioned are: N,N'-bis-(β-aminocrotonyl)-piperazine, N,N'-bis-(β-aminocrotonyl)-hexahydropyrimidine and N,N'-bis-(β-aminocrotonyl)-imidazolidine.

In the process according to the invention, the general practice is to use only one specific β-aminocrotonic acid derivative and only one specific polyisocyanate. It is however possible without disadvantage to use in each case mixtures or reactants. It is thus possible to use mixtures of different β-aminocrotonic acid esters or mixtures of different β-aminocrotonic acid nitriles or of different β-aminocrotonic acid amides. Such esters and nitriles or esters and amides or nitriles and amides can however be mixed to form suitable reactants. The same applies also to the polyisocyanates. One reactant can also be a mixture and the other a pure substance.

In contrast to the process described in the German Offenlegungsschrift No. 2,633,294, the process according to the invention can be performed very advantageously also as a casting process. It is also possible without difficulty to carry out the procedure in solution or on kneaders. The polymers according to the invention can be processed, using known techniques, to form lacquers and binders, as well as moulded articles from moulding materials, and also laminates or products produced by injection moulding, by extrusion or by similar processes. The polymers according to the invention are preferably used for producing moulded articles.

The reactants are selected with regard to reactivity and viscosity to suit the specific type of processing concerned. Since the β-aminocrotonic acid derivatives are very reactive to isocyanate groups, the less reactive aliphatic polyisocyanates are according to the invention preferably used.

It has been established that surprisingly the properties of the polymers according to the invention are even better than those of such polymers which have been produced by comparable methods but with the use of customary hydroxyl compounds as reactants for polyisocyanates (for example polyether polyols or butanediol). A relevant comparison is made in the Examples which follow.

EXAMPLES 1 TO 10

In the Examples 1 to 9, the respective β-aminocrotonic acid derivative and the respective polyisocyanate are mixed and melted in a glass flask and subsequently degassed. If a mixture of an aliphatic and an aromatic polyisocyanate is used, the aliphatic polyisocyanate is firstly mixed with the β-aminocrotonic acid derivative and the mixture is degassed. In a second stage, the aromatic polyisocyanate is mixed in and the mixture is again degassed. Depending on the melting point of the β-aminocrotonic acid derivative, the bath temperature is between 100° and 150° C. The melts obtained in this manner are afterwards poured into moulds having inside dimensions of 140×140×4 mm. By means of subsequent heating in an oven, the melts are converted by crosslinking into clear transparent moulded specimens. The following curing cycle is used:

4 h/120° C.; 6 h/140° C.; 2 to 4 h/160° C.

The procedure is modified in Example 10 as follows: 11.6 g (0.112 equivalent) of β-aminocrotonic acid amide of the formula VII, 17.8 g (0.118 equivalent) of Desmodur N 100 ® and 29.6 g of quartz powder are well mixed at room temperature. In each case, 10.5 g of this mixture are cast into a mould at 130° C. to produce test specimens of dimensions 60×10×4 mm. The mixture is converted at this temperature and under a pressure of about 400 kg/cm² into hard moulded specimens which, after removal from the mould, are after-cured for 1.5 hours at 130° C. and for half an hour at 150° C.

EXAMPLE 11

5.7 g (0.03 equivalent) of a β-aminocrotonic acid ester of the formula III are dissolved in 4 ml of methyl ethyl ketone, and afterwards mixed with 4.8 g (0.03 equivalent) of Desmodur N 100 ®. This mixture is deposited onto a level metal surface. After the solvent has been evaporated off, the mixture is converted by stepwise heating (2 h/60° C.+2 h/80° C.+2 h/100° C.+2 h/120° C.+2 h/140° C.) into a clear transparent sheet.

EXAMPLE 12

The procedure is carried out as in Examples 1 to 9. The β-aminocrotonic acid derivative used is α,ω-triethylene glycol-bis-(aminocrotonic acid ester), designated as $L^2$, and the polyisocyanate used is Desmodur N 100 ®.

The block polyester of the formula III was produced from equivalent amounts of trimethylhexamethylenediamine (isomeric mixture 2,2,4/2,4,4) with 1,4-butanediol-1,4-bis-acetoacetyl ester by removal of the water by azeotropic distillation.

A portion of each sheet is stored for 13 days at room temperature in toluene, ethanol and dimethylformamide. The sheet remains unchanged and does not become detached.

Details of the starting substances and of the test methods

Desmodur N 100 ® and Baymidur K88 ® are products of Bayer A.G. Desmodur N 100 ® is a trimerised hexamethylenediisocyanate obtained by reaction with water in the molar ratio of 3:1 with the splitting-off of $CO_2$; it has an isocyanate equivalent weight of about 160. Baymidur K88 ® is diphenylmethane-4,4'-diisocyanate, which has an isocyanate equivalent weight of 130 to 140.

Comparative Example 1

22.5 g of anhydrous butanediol and 80.0 g of Desmodur N 100 ® are mixed and degassed at about 40° C. The mixture is poured into a mould of dimensions 140×140×4 mm and is converted by means of progressive heating (2 h/60° C.+2 h/90° C.+3 h/120° C.+2 h/140° C.) into a clear transparent moulded specimen, which can be bent at room temperature by hand. The test results obtained from this specimen are given in Table 2.

Comparative Example 2

In place of butanediol, there is used a trifunctional polyol based on polyether, namely, a reaction product from a triol with propylene oxide (Desmophen 550 U ®, a product of Bayer A.G.; OH equivalent weight 148). 49.3 g of this anhydrous product and 53 g of Desmodur N 100 ® are mixed, degassed and cured in the manner described in Comparative Example 1. The test results obtained from this clear transparent moulded specimen which can be bent by hand are likewise summarised in Table 2.

The β-aminocrotonic acid derivatives used are summarised in Table 1.

In Table 2 are listed the reactants, their mixture ratios to make clear the mixture ratios, it is stated in each case how many isocyanate group equivalents there are to one equivalent of the molecular grouping

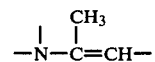

from the β-aminocrotonic acid derivative.

The flexural strength is determined according to VSM 77 103, the impact bend strength according to VSM 77 105, and the dimensional stability under heat according to ISO/R 75. (VSM is the abbreviation for Verein Schweizerischer Maschinenindustrieller [Association of Swiss Machine Manufactures]; and ISO/R is the abbreviation for International Standard Organisation/Recommendation).

TABLE 1

| Designated in Table 2 as | Structural formula of the β-aminocrotonic acid derivative | Linked to the alkylene group in the | Corresponds to the formula |
|---|---|---|---|
| $L^1$ | $(CH_3-C(NH_2)=CH-CO.O\!\!-\!\!)_2$ n-butylene | 1,4-position | I |
| $L^2$ | $CH_3-C(NH_2)=CH-CO.O-CH_2-CH_2-O-CH_2-CH_2-O-CH_2$ with two $CH_3-C(NH_2)=CH-CO.O-CH_2$ terminal groups | | I |
| $L^3$ | $(CH_2=CH-CH_2-O.CO-CH=C(CH_3)-NH\!\!-\!\!)_2$ n-hexylene | 1,6-position | II |
| $L^4$ | $(CH_3-O.CO-CH=C(CH_3)-NH\!\!-\!\!)_2$ n-hexylene | 1,6-position | II |
| $L^5$ | $NC-CH=C(CH_3)-NH-\text{C}_6\text{H}_4-CH_2-\text{C}_6\text{H}_4-NH-C(CH_3)=CH-CN$ | | IV |
| $L^6$ | $(NC-CH=C(CH_3)-NH\!\!-\!\!)_2$ n-hexylene | 1,6-position | IV |
| $L^7$ | $(CH_3-C(NH_2)=CH-CO.NH\!\!-\!\!)_2$ n-hexylene | 1,6-position | VII |
| $L^8$ | condensation product from the isomeric mixture 2,2,4-(2,4,4)-trimethylhexamethylenediamine and 1,4-butanediol-1,4-bis-acetoacetyl ester (block polyester) | | III | and the test values given by the final products. In order

TABLE 2

| Ex. No. | Polyisocyanate | β-Aminocrotonic acid derivative or polyol | Mixture ratio (equivalent ratio) | Flexural strength N/mm² | Impact bend strength KJ/m² | Dimensional stability under heat °C. | Glass transition temperature °C. |
|---|---|---|---|---|---|---|---|
| 1 | Desmodur N 100 ® | $L^1$ | 2,0/1,0 | 135 | 90,7 | 99 | 110 |
| 2 | Desmodur N 100 ® | $L^1$ | 1,5/1,0 | 137 | 65,9 | 93 | 105 |
| 3 | mixture of Desmodur N 100 ® and Baymidur K 88 ® | $L^2$ | 1,0 + 0,35/1,0 | 140 | 62,3 | 88 | — |
| 4 | as Example 3 | $L^3$ | 0,76 + 0,45/1,0 | 83 | 21,5 | 52 | — |
| 5 | Desmodur N 100 ® | $L^4$ | 1,5/1,0 | 115 | 56,5 | 59 | 62 |
| 6 | Desmodur N 100 ® | $L^5$ | 1,27/1,0 | 125 | 55,2 | 101 | — |

TABLE 2-continued

| Ex. No. | Polyisocyanate | β-Amino-crotonic acid derivative or polyol | Mixture ratio (equivalent ratio) | Flexural strength N/mm$^2$ | Impact bend strength KJ/m$^2$ | Dimensional stability under heat °C. | Glass transition temperature °C. |
|---|---|---|---|---|---|---|---|
| 7 | Desomodur N 100 ® | mixture of L$^5$ and L$^6$ | 1,27/0,5 + 0,5 | 128 | 28,7 | 101 | — |
| 8 | 2,2,4-(2,4,4)-tri-methylhexamethylene-diisocyanate | L$^5$ | 1,5/1,0 | — | — | — | 113 |
| 9 | 2,2,4-(2,4,4)-tri-methylhexamethylene-diisocyanate | mixture of L$^1$ and L$^7$ | 2,0/0,66 + 0,33 | — | — | — | 103 |
| 10 | Desmodur N 100 ® | L$^7$ | 1,0/1,0 | 33,7 | 1,0 | — | 79 |
| 11 | Desmodur N 100 ® | L$^8$ | 1,0/1,0 | — | — | — | — |
| 12 | Desmodur N 100 ® | L$^2$ | 1,0/1,0 | 118 | 79 | 79 | — |
| Comp. Example 1 | Desmodur N 100 ® | butanediol | 1,0/1,0 | 83,9* | 81,6 | 50 | 50 |
| Comp. Example 2 | Desmodur N 100 ® | Desmophen 550 U ® | 1,0/1,0 | 59,4* | 74,3 | 41 | 36 |

*specimen does not break; deflection 20 mm

The electrical test data of Example 1 and of the Comparative Example 2 are summarised in Table 3.

TABLE 3

| Ex. No. | Poly-isocyanate | β-amino-crotonic acid or polyol | Mixture ratio (equivalent ratio) | Dialectric loss factor (tgδ:10$^2$) at | | | | Relative dielectric constant (εγ) at | | | |
|---|---|---|---|---|---|---|---|---|---|---|---|
| | | | | 23° C. | 40° C. | 50° C. | 70° C. | 23° C. | 40° C. | 50° C. | 70° C. |
| 1 | Desmodur N 100 ® | L$^2$ | 2,0/1,0 | 1,03 | — | 0,91 | 1,01 | 4,8 | — | 4,9 | 5,0 |
| Comp. Ex. 2 | Desmodur N 100 ® | Desmophen 550 U ® | 1,0/1,0 | 1,29 | 15,4 | 29,4 | >29,4 | 4,7 | 6,4 | 11,5 | >11,5 |

What is claimed is:

1. A process for producing crosslinked unsaturated polymers, which process comprises reacting monomeric or oligomeric β-aminocrotonic acid esters or β-aminocrotonic acid nitriles or β-aminocrotonic acid amides with polyisocyanates, the composition of the reaction mixture being such that to one molecular group of the formula

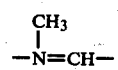

of the respective β-aminocrotonic acid derivative there is at least one isocyanate group.

2. A process according to claim 1, wherein a β-aminocrotonic acid ester of any one of the formulae I to III

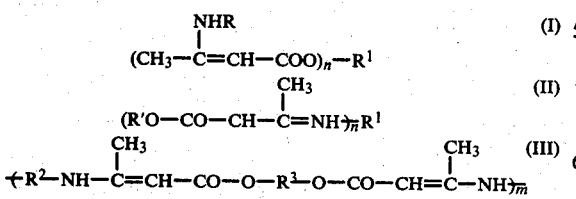

in which R is a hydrogen atom or a saturated or unsaturated, straight-chain, branched-chain or cyclic hydrocarbon radical having up to 9 C atoms, R' is a saturated or unsaturated, straight-chain, branched-chain or cyclic hydrocarbon radical having up to 9 C atoms, n is one of the numbers 2, 3 or 4, and m is a number from 4 to 15, R$^1$ is an n-valent, and R$^2$ and R$^3$ are each a bivalent, straight-chain, branched-chain or cyclic hydrocarbon radical optionally containing ether bridges and having up to 20 C atoms, or a bivalent heterocyclic ring containing N, O or S atoms, whereby R$^2$ and R$^3$ are identical or different, is reacted with polyisocyanates.

3. A process according to claim 2, wherein there is used a β-aminocrotonic acid ester of any one of the formulae I to III wherein R is hydrogen, R' is C$_1$-C$_4$-alkyl or C$_2$-C$_4$-alkenyl, and R$^2$ and R$^3$ are each C$_2$-C$_9$-alkylene.

4. A process according to claim 2, wherein there is used a β-aminocrotonic acid ester of the formula I or II, wherein in each case n is the number 2, and R$^1$ is a bivalent, straight-chain, aliphatic radical optionally containing ether bridges.

5. A process according to claim 4, wherein there is used a β-aminocrotonic acid ester of the formula I in which n is the number 2, and R$^1$ is n-butylene or the group —(CH$_2$CH$_2$—O)$_2$CH$_2$CH$_2$—.

6. A process according to claim 1, in which process a β-aminocrotonic acid nitrile of any one of the formulae IV to VI

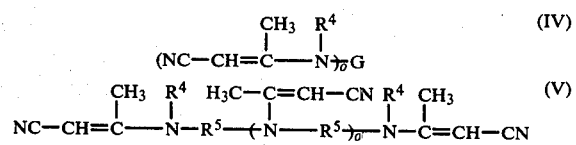

-continued

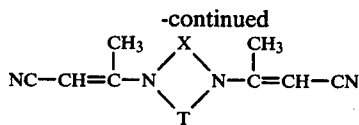
(VI)

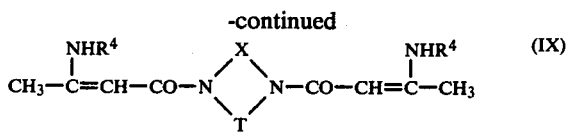
(IX)

in which $R^4$ is a hydrogen atom, alkyl having 1 to 6 C atoms, cycloalkyl having 5 or 6 C atoms or aryl having 6 to 10 C atoms, o' is any one of the numbers 1, 2 or 3, o is the number 2 or 3, G is an o-valent organic radical having 2 to 30 C atoms, and $R^5$ is a bivalent aromatic or aliphatic radical having up to 30 C atoms, and X and T are such organic radicals which form with the two N atoms a 5- or 6-membered heterocyclic ring, is reacted with polyisocyanates.

7. A process according to claim 6, wherein there is used a β-aminocrotonic acid nitrile of any one of the formulae IV to VI, in which $R^4$ is hydrogen, $R^5$ is $C_2$–$C_6$-alkylene, and X and T form with the two N atoms a piperazine ring.

8. A process according to claim 6, wherein there is used a β-aminocrotonic acid nitrile of the formula IV in which in each case o is the number 2, and G is a bivalent aliphatic, aromatic or aromatic-aliphatic radical.

9. A process according to claim 8, wherein there is used a β-aminocrotonic acid nitrile of the formula IV, in which o is the number 2, and G is 4,4'-diphenylmethane or n-hexylene.

10. A process according to claim 1, wherein a β-aminocrotonic acid amide of any one of the formulae VII to IX

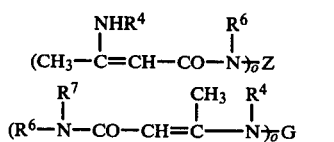
(VII)
(VIII)

in which $R^4$, $R^6$ and $R^7$ independently of one another are each a hydrogen atom, alkyl having 1 to 6 C atoms, cycloalkyl having 5 or 6 C atoms, or aryl having 6 to 10 C atoms, o is either 2 or 3, and G and Z independently of one another are each an o-valent organic radical having 2 to 30 C atoms, and X and T are such organic radicals which form with the two N atoms a 5- or 6-membered heterocyclic ring, is reacted with polyisocyanates.

11. A process according to claim 10, wherein there is used a β-aminocrotonic acid amide of any one of the formulae VII to IX in which $R^4$ and $R^6$ are hydrogen, $R^7$ is $C_1$–$C_4$-alkyl, G is 4,4'-diphenylmethane or n-hexylene, and X and T form with the two N atoms a piperazine ring.

12. A process according to claim 10, wherein there is used a β-aminocrotonic acid amide of the formula VII in which in each case $R^4$ is a hydrogen atom, o is the number 2, and Z is a bivalent aliphatic radical.

13. A process according to claims 1, 2 and 10, wherein a β-aminocrotonic acid ester of the formula I in which n is the number 2, and $R^1$ is n-butylene, is used together with a β-aminocrotonic acid amide of the formula VII in which $R^4$ is hydrogen, o is the number 2, and Z is n-hexylene.

14. A process according to claim 1, wherein aliphatic polyisocyanates are used.

15. A process according to claim 1, wherein there are used trimerised hexamethylenediisocyanate, diphenylmethane-4,4'-diisocyanate or a mixture thereof, or the isomeric mixture of 2,2,4- and 2,4,4-trimethylhexamethylenediisocyanate.

* * * * *